United States Patent [19]

LaBouff

[11] Patent Number: 4,531,269
[45] Date of Patent: Jul. 30, 1985

[54] METHOD OF ASSEMBLING AN IMPROVED HEAT INSULATED PISTON

[75] Inventor: Gary A. LaBouff, Waterloo, Iowa

[73] Assignee: Deere & Company, Moline, Ill.

[21] Appl. No.: 593,460

[22] Filed: Mar. 26, 1984

Related U.S. Application Data

[62] Division of Ser. No. 280,403, Jul. 6, 1981, Pat. No. 4,459,900.

[51] Int. Cl.³ ............................................. B23P 15/10
[52] U.S. Cl. ................................. 29/156.5 R; 29/434; 29/447; 29/DIG. 35; 92/187; 92/189; 92/212; 92/213; 92/220; 123/193 P
[58] Field of Search ................... 29/156.5 R, 156.5 A, 29/434, 447, DIG. 35; 92/187, 189, 190, 191, 212, 213, 220, 224; 123/193 P

[56] References Cited

U.S. PATENT DOCUMENTS

| | | | |
|---|---|---|---|
| 1,462,655 | 7/1923 | Philip | 92/212 |
| 1,464,612 | 8/1923 | Madler | 29/156.5 R X |
| 1,490,849 | 4/1924 | Philip | 29/156.5 R |
| 1,790,664 | 2/1931 | Horton | 92/224 |
| 2,066,802 | 1/1937 | Rowntree | 92/224 |
| 2,296,469 | 9/1942 | Kastler | 92/187 |
| 2,752,668 | 7/1956 | Sheen | 29/447 X |
| 3,191,264 | 6/1965 | Underwood et al. | 92/187 UX |
| 4,018,194 | 4/1977 | Mitchell et al. | 123/193 P X |
| 4,245,611 | 1/1981 | Mitchell et al. | 123/193 P X |
| 4,372,179 | 2/1983 | Dolenc et al. | 92/187 X |

Primary Examiner—Howard N. Goldberg
Assistant Examiner—Ronald S. Wallace

[57] ABSTRACT

An improved heat insulated piston assembly for an internal combustion engine and a method of assembly. The improved piston assembly includes a piston constructed of a sleeve having an interference fit about a heat insulated core. The core has a first end positioned flush with an end of the sleeve and has a second end located within the sleeve with a concave configured cavity formed therein. Mating in the concave configured cavity of the core is a connecting rod having a spherical ball shaped end. The spherical ball shaped end is securely held in the cavity by a retaining ring which attaches to the piston sleeve. The retaining ring allows for limited movement of the spherical ball shaped end of the connecting rod in the cavity while providing a means for returning the piston to its bottom position during the intake stroke.

4 Claims, 1 Drawing Figure

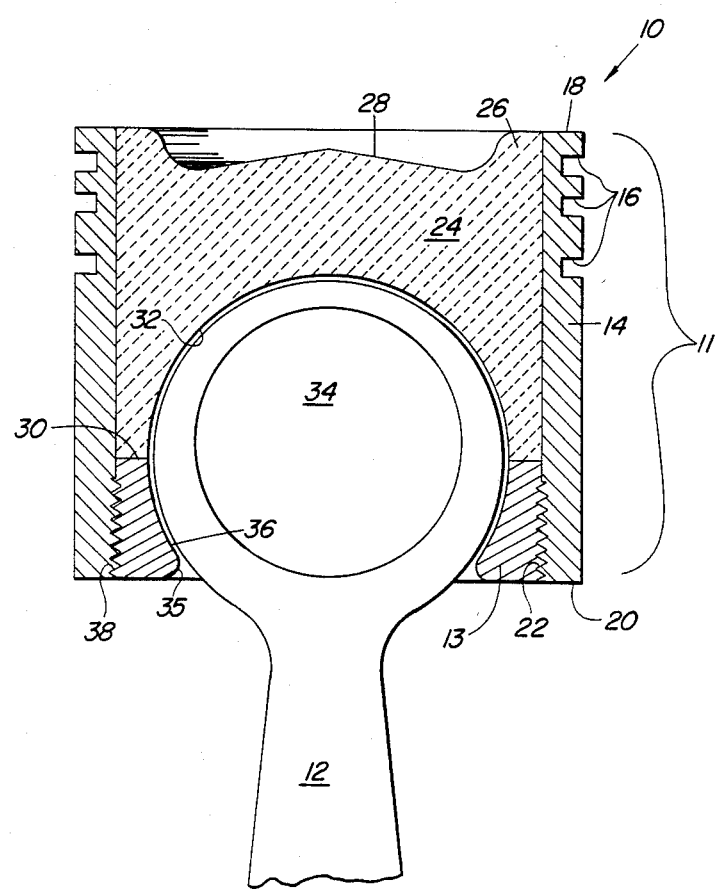

METHOD OF ASSEMBLING AN IMPROVED HEAT INSULATED PISTON

This is a division of application Ser. No. 06/280,403, filed July 6, 1981, now U.S. Pat. No. 4,459,900, issued July 17, 1984.

BACKGROUND OF THE INVENTION

This invention relates to a method of assembling an improved heat insulated piston for an internal combustion engine.

DESCRIPTION OF THE PRIOR ART

The current trend in the manufacture of internal combustion engines is to design and build engines which can operate at very high temperatures and pressures with little or no cooling. Prior attempts to do this have resulted in the production of pistons which were coated or capped with a heat insulated or heat resistant material. Some U.S. patents which teach such designs include: No. 1,490,849 issued to Phillips on Apr. 15, 1924; No. 3,911,891 issued to Dowell on Oct. 14, 1975; No. 4,018,194 issued to Mitchell et al on Apr. 19, 1977; and No. 4,245,611 issued to Mitchell et al on Jan. 20, 1981. These prior art pistons, although being an improvement over the all steel or all aluminum constructed pistons, have a disadvantage in that the heat insulated material is utilized in such a fashion that it is susceptable to breakage due to high tensile stresses. Furthermore, the pistons which use an insertable ceramic cap, such as taught by Mitchell (611), are limited in their heat insulating capacity and usually require a cushioning layer between the piston body and the cap to reduce and distribute the non-symmetrical stress loads. Now an improved heat insulated piston assembly has been invented which is an improvement over the prior art.

SUMMARY OF THE INVENTION

Briefly, this invention relates to an improved heat insulated piston assembly for use in an internal combustion engine and a method of assembly. The piston includes a cylindrical sleeve having helical threads formed on a portion of its inner circumference adjacent to one end. This sleeve is secured to a heat insulated core by an interference fit such that a first end of the core is flush with the top end of the sleeve. The other end of the core contains a hemi-spherically shaped cavity which is completely surrounded by the sleeve and is positioned adjacent to the helical threads. The hemi-spherically shaped cavity is matable with a connecting rod having a spherical ball shaped end. The spherical ball shaped end, which is slightly smaller in diameter than the hemi-spherically shaped cavity, is securely held in place by a retaining ring which has an arcuately shaped inner circumferential surface and a threaded outer circumference. As the retaining ring is threaded into the sleeve, the spherical ball shaped end of the connecting rod is joined to the cavity of the core such that stress forces developed during engine operation can be transferred from the core to a large area of the connecting rod. This transfer of developed force is essentially symmetrical over the entire surface area of the spherical ball and provides for low unit contact pressures between the core and the connecting rod, and hence low surface stresses. Also, since the insulated core can contact the rod directly without additional support, a greater thickness of insulating material can be used without increasing the piston height.

A method for assembling the heat insulated piston assembly is also taught whereby the sleeve is first thermally expanded, the core is inserted into the sleeve and the sleeve is then cooled to room temperature so as to form an interference fit. The spherical ball shaped end of the connecting rod is then positioned into the hemi-spherically shaped cavity of the core. While so retained, the retaining ring is placed about the connecting rod and is attached to the sleeve to hold the members together.

The general object of this invention is to provide an improved heat insulated piston assembly and its method of assembly onto a connecting rod such that a symmetrical stress pattern is realized by the piston during engine operations. A more specific object of this invention is to provide an improved heat insulated piston assembly which can operate at higher combustion temperatures with reduced heat losses and with improved engine efficiency.

Another object of this invention is to provide an improved heat insulated piston assembly which exhibts lower tensile stresses on the insulating member of the heat insulated piston.

Still another object of this invention is to provide an improved heat insulated piston assembly which has a longer life expectancy than currently available ceramic pistons.

A further object of this invention is to provide an improved heat insulated piston assembly which is economical to build and simple to assemble.

Other objects and advantages of the present invention will become more apparent to those skilled in the art in view of the following description and the drawing.

BRIEF DESCRIPTION OF THE DRAWING

The FIG. is a cross-sectional view of the improved heat insulated piston assembly.

DETAILED DESCRIPTION OF THE PREFERRED EMBODIMENT

Referring to the FIG. 1., an improved heat insulated piston assembly 10 is shown comprised of a piston 11, a connecting rod 12 and a retaining means 13. The piston 11 is formed of a cylindrical elongated sleeve 14, preferably made of steel, which has at least one piston ring groove 16 formed in its outer periphery approximate a first end 18. Located on the inner circumference of the sleeve 14, approximate a second end 20, is an attachment means 22. The attachment means 22 is depicted as helical threads but other types of fasteners can be used which are known to those skilled in the fastening arts. Preferably, the attachment means 22 enables assembly and disassembly of the retaining means 13 from the piston 11. A heat insulated core 24 is held in the sleeve 14 by an interference fit. The interference fit places the core 24 in a pre-stressed state wherein it has an axisymmetric compressive stress state about the central or longitudinal axis of the sleeve 14. The interference fit also secures the sleeve 14 to the core 24 such that no separation will occur during normal piston operation within the cylindrical bore of the engine. The desired range of interference fit between the core 24 and the sleeve 14 is determined such that the tensile stresses due to the gas pressure exerted on the piston 11 during combustion never overcomes the initial compressive stresses in the core 24. This feature is important for it reduces and practically eliminates the tensile stress forces felt by the core 24. One method of establishing the desired interference fit is to thermally expand the sleeve 14 to approximately 60 percent of the melting point of the sleeve material, insert the expanded sleeve 14 around the core 24 and then cool the sleeve 14 back down to room temperature. The resulting interference fit should be approximately 80 to 100 percent of the yield strength of the sleeve 14. Preferably, the interference fit is 95 percent of the yield strength of the sleeve 14.

The core 24 is constructed of a heat insulated or heat resistant material such as a ceramic, preferably a high density ceramic, which has a relatively high insulative value. Acceptable heat insulated or heat resistant materials include: zirconia, silicon nitrides, silicon carbides, and compositions thereof. A stabilizer can also be added to the material to increase its structural, thermal and wear properties. An example of a stabilizer is magnesium oxide.

The core 24 is fitted to the sleeve 14 such that a first end 26 of the core 24 is approximately flush with the first end 18 of the sleeve 14. This design allows the top edge of the piston 11 to move close to the inner surface of the cylinder head of the engine during its reciprocative movement within the cylinder. Formed within the first end 26 of the core 24 is a combustion chamber 28. The combustion chamber 28 can be of various configuration but should not contain any sharp corners because ceramic materials, in general, are notch sensitive and tend to crack or deform at such locations. Alternative designs for the combustion chamber 28, including arranging the combustion chamber 28 completely within the cylinder head, or partially within the cylinder head and partially in the core 24 can be utilized. These alternate designs are well known to those skilled in the engine arts.

The core 24 also has a second end 30 which is retained within the confines of the sleeve 14 adjacent to the attachment means 22. This second end 30 has formed therein a concave configured cavity 32, preferably hemi-spherical in configuration and completely open to the second end 20 of the sleeve 14. Matable with the concave configured cavity 32 is a spherical ball shaped end 34 formed on one end of the connecting rod 12. The spherical ball shaped end 34, which has a hollow interior in order to reduce the weight of the assembly, has a diameter which is slightly less than the diameter of the concave configured cavity 32. Preferably, a diameter of a few thousand less, from 0.001–0.010 inches for a four inch diameter piston, is sufficient. This slight dimensional difference between the concave configured cavity 32 and the outer periphery of the spherical ball 34 allows for a certain amount of flexibility while providing for a large contactable surface through which developed combustion stress forces can be transferred. Although most ceramic materials exhibit good heat insulating characteristics and can withstand large compressive loads, they are very weak in tension. The arrangement of the spherical ball 34 and the hemispherical cavity 32 places the core 24 in an axisymmetric stress state under the gas pressure loads exerted on the piston 11 by the combustion of the fuel and air mixtures in the combustion chamber 28. The greatest forces exerted on the piston assembly 10 occur during the power stroke when the piston 11 is forced downward by the combustion of the fuel mixture. By distributing the developed stresses on the core 24 symmetrically over the entire surface of the spherical ball 34, an improved piston assembly 10 is achieved which will have a longer life expectancy over conventional ceramic pistons.

The spherical ball shaped end 34 of the connecting rod 12 is joined to the piston 11 by the retaining means 13. The retaining means 13, is an annular ring containing a central aperture 35 having an arcuately shaped inner surface 36 which approximately conforms to the outer peripheral surface of the spherical ball 34. The smallest diameter of the aperture 35 is large enough to encircle the stem of the connecting rod 12 while preventing the spherical ball 34 from passing therethrough. The diameter of the largest portion of the arcuately shaped surface 36 is slightly larger than the diameter of the spherical ball 34 and approximately equal to the diameter of the concave configured cavity 32. The purpose of this size difference is to allow for limited movement of the spherical ball 34 in the area formed by the concave configured cavity 32 and the arcuately shaped surface 36 of the retaining means 13. Located on the outer circumference of the retaining means 13 is an attaching device 38, such as screw threads, which mate with the attachment means 22 on the sleeve 14. The retaining ring 13 can contain a slit in its circumference which will allow the ring 13 to be partially parted and slipped over the shank of the connecting rod 12. The retaining means 13 is designed to transfer forces from the connecting rod 12 to the core 24 via the sleeve 14 during the intake stroke of the cycle when the piston 11 is moving downward. During this portion of the cycle, only low cylinder pressures are present. It should be noted that during the power stroke, the forces from combustion are transmitted through the core 24 to the connecting rod 12 and the retaining means 13 experiences little if any forces. Likewise, on both of the upstrokes, the retaining means 13 is not transferring any appreciable force between the connecting rod 12 and the sleeve 14.

This improved heat insulated piston assembly 10 is capable of handling engine temperature in the range of from about -40 degrees Celsius to 1000 degrees Celsius and engine combustion pressures up to about 2500 psi.

One method of assembling the heat insulated piston 11 to the connecting rod 12 is as follows: first, the heat insulated core 24 is placed on a flat surface in an inverted position (resting on its first end 26); second, the sleeve 14 is thermally expanded by heating it to approximately 60 percent of the melting point of the sleeve material; third, the heated sleeve 14 is inverted and placed around the core 24 such that its first end 18 is flush with the first end 26 of the core 24; and fourth, the sleeve 14 is allowed to cool to room temperature thereby forming an interference fit between the outer diameter of the core 24 and the inner diameter of the sleeve 14. This interference fit places the core 24 in a pre-stressed state having an axisymmetric state of compressive stress about the central axis of the core 24. The retaining ring 13 is then placed around the connecting rod 12 and is slid along its shank towards the spherical end 34. Optionally, the retaining ring 13 can contain a slit which allows the ring 13 to be opened and placed around the shank of the connecting rod 12. The core and sleeve assembly is then positioned on the spherical ball shaped end 34 of the connecting rod 12 such that the spherical end 34 mates with the concave cavity 32 of the core 24. The retaining ring 13 is then attached to the sleeve 14 by the threads 22 and 38. When in place, the retaining ring 13 is tight against the second end 30 of the core 24.

While the invention has been described in conjunction with a specific embodiment, it is to be understood that many alternatives, modifications, and variations will be apparent to those skilled in the art in light of the aforegoing description. Accordingly, it is intended to embrace all such alternatives, modifications, and variations which fall within the spirit and scope of the appended claims.

I claim:

1. A method of assembling an improved heat insulated piston and attaching the same to a connecting rod having a spherical ball shaped end, said piston including a sleeve surrounding a heat insulated core having a hemi-spherically shaped cavity formed in one end thereof, said method comprising:
   (a) placing said core on a flat surface in an inverted position with said hemi-spherically shaped cavity facing upward;
   (b) thermally expanding said sleeve by heating it to approximately 60 percent of the melting point of the sleeve material;
   (c) placing said thermally expanded sleeve in an inverted position around said core such that one end of said sleeve is flush with the end of said core on the flat surface;
   (d) cooling said sleeve to room temperature to form an interference fit with said core thereby forming a heat insulated piston;
   (e) placing said retaining ring around said connecting rod adjacent to said spherical ball shaped end;
   (f) positioning said heat insulated piston on said spherical ball shaped end of said connecting rod; and
   (g) attaching said retaining ring to said sleeve to form an assembly between said piston and said connecting rod;

2. The method of claim 1 wherein the interference fit is approximately 80 to 100 percent of the yield strength of said sleeve.

3. The method of claim 2 wherein the interference fit is approximately 95 percent of the yield strength of said sleeve.

4. A method of assembling an improved heat insulated piston and attaching the same to a connecting rod having a spherical ball shaped end, said assembly including: a cylindrical elongated sleeve with at least one circular groove formed adjacent a first end in its outer circumference and having threads formed on a portion of its inner circumference approximate a second end, a heat insulated core containing a hemi-spherically shaped cavity formed therein, and a retaining ring having a threaded outer circumference and an arcuately shaped inner circumferential surface, said method comprising:
   (a) placing said core on a flat surface in an inverted position with said hemi-spherically shaped cavity facing upward;
   (b) thermally expanding said sleeve by heating it to approximately 60 percent of the melting point of the sleeve material;
   (c) placing said thermally expanded sleeve in an inverted position around said core such that one end of said sleeve is flush with the end of said core on the flat surface;
   (d) allowing said sleeve to cool down to room temperature to form an interference fit with said core, whereby said interference fit is approximately 80 percent of the yield strength of said sleeve;
   (e) placing said retaining ring around said connecting rod such that said arcuately shaped inner circumferential surface contacts said spherical ball shaped end of said connecting rod;
   (f) positioning said hemi-spherically shaped cavity of said core on said spherical ball shaped end of said connecting rod; and
   (g) threading said retaining ring into said threaded portion of said sleeve for securing said spherical ball shaped end of said connecting rod to said cavity formed in said core.

* * * * *